UNITED STATES PATENT OFFICE.

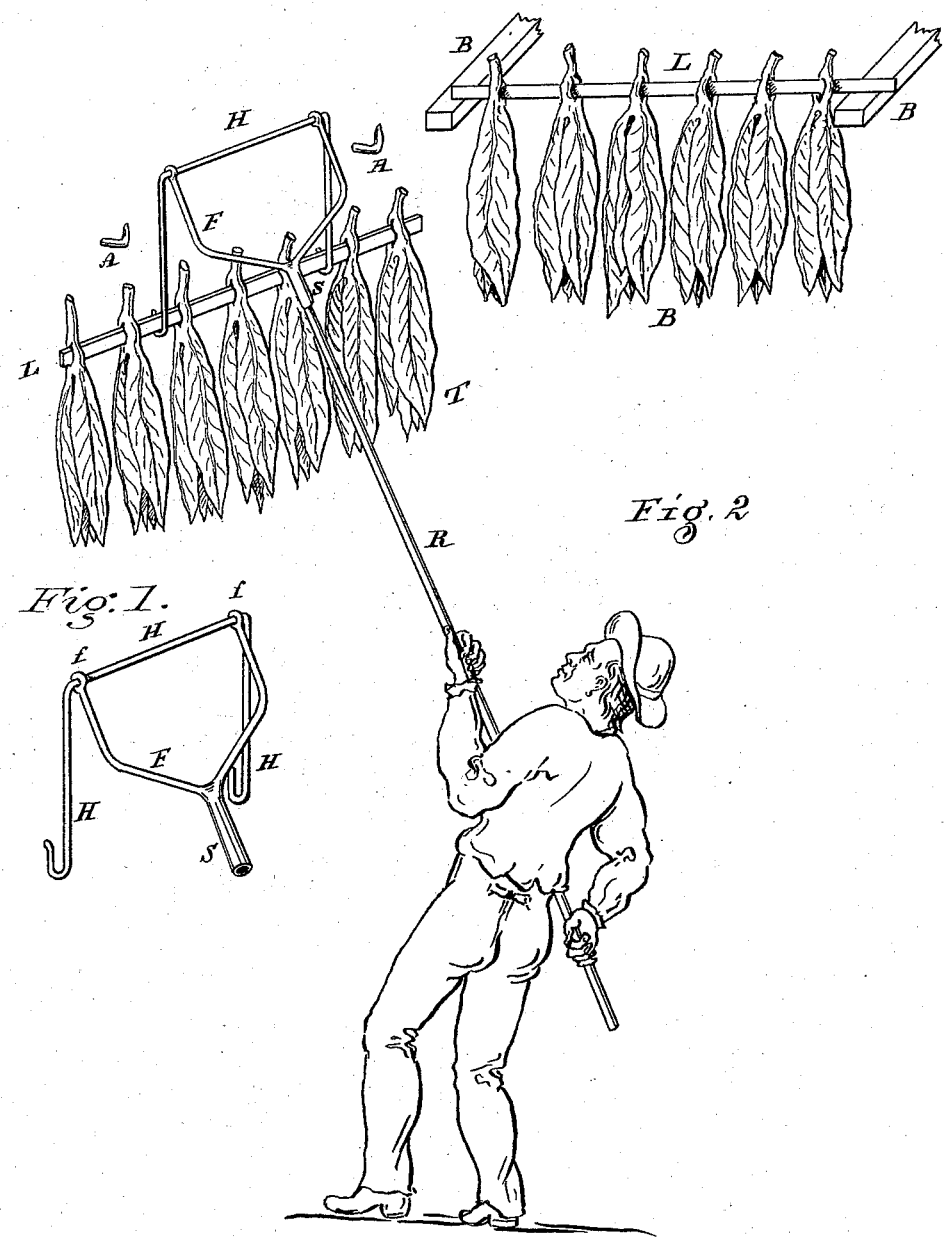

MICHAEL W. SHARER, OF MOUNT JOY TOWNSHIP, (MILTON GROVE P. O.,) LANCASTER COUNTY, ASSIGNOR OF ONE-HALF HIS RIGHT TO SIMON L. BRANDT, OF MARIETTA, PENNSYLVANIA.

IMPROVEMENT IN IMPLEMENTS FOR HANDLING LEAF-TOBACCO.

Specification forming part of Letters Patent No. 219,368, dated September 9, 1879; application filed May 27, 1879.

*To all whom it may concern:*

Be it known that I, MICHAEL W. SHARER, of Mount Joy township, (Milton Grove P. O.,) Lancaster county, and State of Pennsylvania, have invented certain Improvements in Implements for Handling Leaf-Tobacco, of which the following is a specification.

The object of this invention is to provide an improved implement for elevating tobacco-plants hung upon a lath, and placing them in position for air-drying without a scaffolding temporarily constructed, and that cause frequent mishaps. Besides, one man can perform the work of two.

Figure 1 is a perspective view of the implement with its socket S, arms F, terminal bearings $f$, swinging cross-bar, and hooks H H H. Fig. 2 illustrates its use or application with a staff inserted.

It is the custom, at least in this section, for tobacco-growers to cut and impale the plants of the leaf-bunch upon a lath, L, of six or seven bunches. These are hung in rows from one beam to another on the wagon, and hauled to the drying-shed prepared for it. Usually ladders or scaffolding are employed to enable the men to hang up the upper and higher tiers of lath with the bunches of leaves undisturbed. The scaffolding is not only costly and tedious, and usually hastily put up, and apt to prove a trap to those upon it. When ladders or steps are used it is found to consume time in changing them, as two are usually required and two men to handle the laths. These considerations have led me to devise an implement for lifting the lath and tobacco-plants from the vehicle and elevating and lodging them on hooks or cross-pieces at once to their place for being dried.

This implement consists of two tines or prongs, F, from a point or handle-socket, S, like an ordinary fork, only these prongs are terminated by an open eye, $f$, which forms the bearing of a cross-rod, bent down on each side outside the bearing and terminated by a hook.

Fig. 1 shows the double swinging hook H H, in one piece, and the socket and eyed branches S F $f$. An ordinary wooden handle, R, is inserted into the socket, and the implement is completed and ready for use.

I am aware that a cross-arm having a hook at each end has been patented; but this cross-bar is rigidly affixed to a short central arm, which latter is pivoted to the end of a staff. Such an arrangement I do not claim.

By adopting a socket-and-screw fastening or clamp I can use a long or short staff to my implement, as circumstances may demand; and by producing the outer end of the socket into two arms, spread apart and terminated by annular bearings, in which bearings the cross-bar swings freely, with its connected hook close to the outside of each bearing, I am enabled more readily to poise and handle a longer lath, which I deem a decided improvement. Therefore

What I claim as my improved implement is—

The combination of the socket S with its spreading arms F, terminated by annular bearings $f$, in which a cross-arm freely swings, said cross-arm being provided with a hook, H, on each end outside the bearings $f$, the whole arranged and operating as and for the purpose set forth.

MICHAEL W. SHARER.

Witnesses:
C. M. MARTIN,
A. K. MARTIN.